(12) United States Patent
Montagna et al.

(10) Patent No.: US 8,910,054 B2
(45) Date of Patent: Dec. 9, 2014

(54) AUDIT ACTION ANALYZER

(75) Inventors: James Charles Montagna, Matthews, NC (US); Anthony Keith Stone, Charlotte, NC (US); Craig S. Diekman, Mooresville, NC (US); Karen Yuki Barnett, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 774 days.

(21) Appl. No.: 12/760,345

(22) Filed: Apr. 14, 2010

(65) Prior Publication Data
US 2011/0258558 A1 Oct. 20, 2011

(51) Int. Cl.
*G06F 3/00* (2006.01)
*G06Q 10/10* (2012.01)

(52) U.S. Cl.
CPC ..................................... *G06Q 10/10* (2013.01)
USPC .......................................... 715/751; 715/752

(58) Field of Classification Search
CPC .............. G06F 11/3438; G06Q 10/06; G06Q 10/063114; G06Q 10/06311; G06Q 10/06398
USPC .................................. 715/751–759; 705/7.15
See application file for complete search history.

(56) References Cited

U.S. PATENT DOCUMENTS

| | | | |
|---|---|---|---|
| 5,794,252 A | 8/1998 | Bailey et al. | |
| 6,029,144 A * | 2/2000 | Barrett et al. | 705/30 |
| 6,453,345 B2 * | 9/2002 | Trcka et al. | 709/224 |
| 6,553,392 B1 | 4/2003 | Mosher, Jr. et al. | |
| 6,829,564 B2 * | 12/2004 | Tanaka et al. | 702/182 |
| 7,280,976 B2 * | 10/2007 | Litwiller et al. | 705/7.41 |
| 7,330,819 B2 * | 2/2008 | Sinex | 705/4 |
| 7,433,829 B2 * | 10/2008 | Borgia et al. | 705/7.13 |
| 7,448,048 B1 | 11/2008 | Nesamoney et al. | |
| 7,523,301 B2 * | 4/2009 | Nisbet et al. | 713/153 |
| 2002/0156671 A1 * | 10/2002 | Libra et al. | 705/9 |
| 2002/0184255 A1 * | 12/2002 | Edd et al. | 707/500 |
| 2003/0033228 A1 * | 2/2003 | Bosworth-Davies et al. | 705/35 |
| 2003/0153991 A1 * | 8/2003 | Visser et al. | 700/79 |
| 2003/0158770 A1 * | 8/2003 | Carlson et al. | 705/9 |

(Continued)

OTHER PUBLICATIONS

International Search Report and Written Opinion of the International Searching Authority mailed Sep. 15, 2011 for International Application No. PCT/US2011/031813.

(Continued)

*Primary Examiner* — Amy Ng
*Assistant Examiner* — William Wong
(74) *Attorney, Agent, or Firm* — Michael A. Springs; Moore and Van Allen, PLLC; Jeffrey R. Gray

(57) ABSTRACT

Audit reporting applications provide audit users the ability to perform reviews of compliance procedures used throughout a business that require supervisors to take actions on the communication between personnel. The action analyzer tool compiles, filters, and sorts message and action information, allows more advance analytics about the information, and answers complex questions that are not easily available by looking at the raw message and action information. The action analyzer tool breaks down the actions taken in order to determine if the supervisors are trying to take credit for an action that they did not actually perform or otherwise violating the accepted procedures for proper supervision and compliance. The message and action information can be sorted into number of actions taken within a specific time frame, the number of actions performed after a specified date, and/or the number of actions taken without the message being reviewed, to name a few.

12 Claims, 4 Drawing Sheets

(56) References Cited

U.S. PATENT DOCUMENTS

| | | | |
|---|---|---|---|
| 2003/0167310 A1* | 9/2003 | Moody et al. ............... 709/206 |
| 2003/0187782 A1* | 10/2003 | Sgaraglio et al. ............. 705/39 |
| 2003/0237005 A1 | 12/2003 | Bar-Or et al. |
| 2004/0107127 A1* | 6/2004 | Kanzinger et al. ............. 705/9 |
| 2004/0128186 A1* | 7/2004 | Breslin et al. ................ 705/10 |
| 2005/0038687 A1* | 2/2005 | Galdes ............................ 705/9 |
| 2005/0138541 A1* | 6/2005 | Euchner et al. .............. 715/512 |
| 2005/0166154 A1* | 7/2005 | Wilson et al. ................ 715/751 |
| 2005/0193043 A1 | 9/2005 | Hoover |
| 2005/0197952 A1* | 9/2005 | Shea et al. ..................... 705/38 |
| 2005/0251409 A1* | 11/2005 | Johnson et al. ................ 705/1 |
| 2005/0251535 A1* | 11/2005 | Theissen et al. ............. 707/200 |
| 2006/0004651 A1* | 1/2006 | Corr et al. ...................... 705/38 |
| 2006/0031351 A1* | 2/2006 | Marston et al. .............. 709/206 |
| 2006/0053199 A1* | 3/2006 | Pricken et al. ................ 709/206 |
| 2006/0069605 A1* | 3/2006 | Hatoun ............................ 705/9 |
| 2006/0085238 A1* | 4/2006 | Oden et al. ...................... 705/7 |
| 2006/0200496 A1* | 9/2006 | Okman et al. .............. 707/104.1 |
| 2006/0242063 A1* | 10/2006 | Peterson et al. ................ 705/42 |
| 2007/0156495 A1* | 7/2007 | King ............................... 705/8 |
| 2007/0192478 A1 | 8/2007 | Louie et al. |
| 2007/0203718 A1* | 8/2007 | Merrifield, Jr. ................. 705/1 |
| 2007/0297577 A1 | 12/2007 | Wyss |
| 2007/0299755 A1* | 12/2007 | Carr ................................. 705/35 |
| 2008/0065460 A1* | 3/2008 | Raynor ............................. 705/9 |
| 2008/0120574 A1* | 5/2008 | Heredia et al. ................ 715/835 |
| 2008/0189622 A1* | 8/2008 | Sanchez et al. ............... 715/752 |
| 2009/0182653 A1* | 7/2009 | Zimiles ........................... 705/30 |
| 2009/0222484 A1* | 9/2009 | Nordhielm et al. ........ 707/104.1 |
| 2009/0292632 A1* | 11/2009 | Dheer et al. .................... 705/35 |
| 2009/0292739 A1* | 11/2009 | Marsh et al. .................. 707/200 |
| 2010/0036671 A1* | 2/2010 | Chu et al. .......................... 705/1 |
| 2010/0077316 A1* | 3/2010 | Omansky et al. ............. 715/751 |
| 2010/0106533 A1* | 4/2010 | Alvarez ............................ 705/4 |
| 2010/0274620 A1* | 10/2010 | Upadhyaya et al. ............. 705/9 |
| 2011/0035379 A1* | 2/2011 | Chen et al. .................... 707/740 |
| 2011/0047483 A1* | 2/2011 | Low et al. ..................... 715/752 |
| 2011/0054968 A1* | 3/2011 | Galaviz ....................... 705/7.28 |
| 2011/0093471 A1* | 4/2011 | Brockway et al. ............ 707/747 |

OTHER PUBLICATIONS

International Prliminary Report on Patentability and Written Opinion dated Oct. 16, 2012 for International Application No. PCT/US2011/031813.

* cited by examiner

AUDIT ACTION ANALYZER

FIELD

This invention relates generally to the field of audit analytics, and more particularly embodiments of the invention relate to apparatuses and methods for online audit portals that provide advanced analytics for identifying potential process violations within message tracking audit reviews.

BACKGROUND

Governments (both states and federal), or in some cases businesses on their own accord, require that tasks performed by lines of business or individual employees are monitored for risk management, compliance, or regulatory reporting, to name a few. In some cases, the government monitors the audit procedures of businesses and requires businesses to submit reports of the results of the businesses' audits. For example, the government may ask a business to prove that the supervisors within the business are reviewing employees, systems, or processes that they are required to review for regulatory compliance. In other cases, the businesses in general or lines of business within the businesses, may develop and implement their own compliance procedures to review employees, systems, or processes in order to, for example, reduce risk in business processes that deal with large sums of money, or as a way to provide checks and balances for the responsibilities of employees.

In some cases audit systems are set up electronically to monitor actions taken by employees, systems, or processes within various applications that are running within the business. The audit systems, in particular, allow for the supervision of the electronic communication flowing through the network, such as e-mail, instant message ("IM"), financial program messaging, etc. Typical audit systems of electronic communications in businesses simply provide a time stamp as to when a particular message was opened by a supervisor, which does not provide relevant information for determining if the supervisor reviewed the message and performed his/her audit responsibilities properly. Therefore, there is a need to develop apparatuses and methods that help businesses to provide improved audit monitoring systems.

BRIEF SUMMARY

Embodiments of the present invention address the above needs and/or achieve other advantages by providing apparatuses (e.g., a system, computer program product, and/or other device) and methods that provide improved internal and external reporting of employees, systems, or processes within applications that businesses use.

The audit reporting application, generally provides audit users the ability to perform reviews of compliance procedures used throughout the business that require supervisors to take actions on the communication sent and received between the regulated personnel at the business. The supervisors may be required by the compliance procedures to review any messages that have been flagged as inappropriate or violating a business compliance policy. After reviewing the message, the supervisors take actions on the message, which comprise of accepting or rejecting the message as being appropriate or compliant, and/or adding comments or sending warning notifications, as appropriate. Information related to the flagged messages and the associated actions are stored in an audit log. The audit reporting application extracts the information from the audit log about the flagged messages and actions taken by the supervisors for analysis by the action analyzer tool. The message and action information could include, for example, the date the action was taken, the action taken, the person who took the action, a reference to what message the person took the action on, etc.

The action analyzer tool compiles, filters, and sorts the message and action information, allows more advance analytics about the information, and answers complex questions that are not easily available by looking at the raw message and action information. The action analyzer tool breaks down the actions taken by the supervisors by running a number of different types of analytic usage patterns in order to determine if the supervisor is trying to take credit for an action that the supervisor did not actually perform or otherwise violating the accepted procedures for proper supervision and compliance. The usage patterns are custom threshold parameters that users of the tool can use to sort the message and action information into results that are more meaningful to the audit user. The message and action information can be sorted into number of actions taken within a specific time frame, the number of actions performed after a specified date, and/or the number of actions taken without the message being reviewed, to name a few. Various embodiments of the invention are described below.

One embodiment of the invention is an audit system comprising, a memory device, a communication device, and a processing device operatively coupled to the memory device and the communication device. The processing device is configured to execute computer-readable program code to extract message information from messages in an application, wherein the message information includes information regarding actions taken or not taken with respect to the message. The processing device is further configured to receive input related to a custom threshold for identifying the message information that meets the custom threshold. The processing device is also configured to generate a list of custom message information that meets the custom threshold. The processing device is further configured to display the list of custom message information that meets the custom threshold.

In further accord with an embodiment of the invention, the messages in an application that the message information is extracted from are messages that have been identified as inappropriate or do not comply with business practices.

In another embodiment of the invention, the supervisor is tasked with assigning an action to the messages in the application. In yet another embodiment of the invention, the action assigned is either to reject or accept the message as inappropriate or not complying with business practices.

In still another embodiment of the invention, the processing device is further configured to execute computer-readable program code to display the message information for filtering, sorting, or grouping.

In another embodiment of the invention, the processing device is further configured to execute computer-readable program code to receive input related to users that have access to the audit system.

In yet another embodiment of the invention, the custom threshold comprises a number of instances where an action was performed on a message within a specified time period.

In still another embodiment of the invention, the custom threshold comprises a number of instances where an action was performed on a message a number of days after the message was identified in the application.

In another embodiment of the invention, the custom threshold comprises a number of instances where an action was performed on a message without viewing the content of the message.

One embodiment of the invention is a computer program product for an audit system. The computer program product comprises at least one non-transitory computer-readable medium having computer-readable program code portions embodied therein. The computer-readable program code portions comprise an executable portion configured for extracting message information from messages in an application, wherein the message information includes information regarding actions taken or not taken with respect to the message. The computer-readable program code portions further comprise an executable portion configured for receiving input related to a custom threshold for identifying the message information that meets the custom threshold. The computer-readable program code portions also comprise an executable portion configured for generating a list of custom message information that meets the custom threshold. The computer-readable program code portions further comprise an executable portion configured for displaying the list of custom message information that meets the custom threshold.

In further accord with an embodiment of the invention, the messages in an application that the message information is extracted from are messages that have been identified as inappropriate or do not comply with business practices.

In another embodiment of the invention, a supervisor is tasked with assigning an action to the messages in the application. In yet another embodiment of the invention, the action assigned is either to reject or accept the message as inappropriate or not complying with business practices.

In still another embodiment of the invention, the computer program product further comprises an executable portion configured for displaying the message information for filtering, sorting, or grouping.

In another embodiment of the invention, the computer program product further comprises an executable portion configured for receiving input related to users that have access to the audit system.

In yet another embodiment of the invention, the custom threshold comprises a number of instances where an action was performed on a message within a specified time period.

In still another embodiment of the invention, the custom threshold comprises a number of instances where an action was performed on a message a number of days after the message was identified in the application.

In another embodiment of the invention, the custom threshold comprises a number of instances where an action was performed on a message without viewing the content of the message.

One embodiment of the invention is an audit analyzer method. The method comprises extracting message information from messages in an application, using a processing device operatively coupled to a memory device, and a communication device, and configured to execute computer-readable program code, wherein the message information includes information regarding actions taken or not taken with respect to the message. The method further comprises receiving input related to a custom threshold for identifying the message information that meets the custom threshold, using a processing device. The method also comprises generating a list of custom message information that meets the custom threshold, using a processing device. The method further comprises displaying the list of custom message information that meets the custom threshold, using a processing device.

In further accord with an embodiment of the invention, the messages in an application that the message information is extracted from are messages that have been identified as inappropriate or do not comply with business practices.

In another embodiment of the invention, a supervisor is tasked with assigning an action to the messages in the application. In yet another embodiment of the invention, the action assigned is either to reject or accept the message as inappropriate or not complying with business practices.

In still another embodiment of the invention, the method further comprises displaying the message information for filtering, sorting, or grouping.

In another embodiment of the invention, the method further comprises receiving input related to users that have access to the audit system.

In yet another embodiment of the invention, the custom threshold comprises a number of instances where an action was performed on a message within a specified time period.

In still another embodiment of the invention, the custom threshold comprises a number of instances where an action was performed on a message a number of days after the message was identified in the application.

In another embodiment of the invention, the custom threshold comprises a number of instances where an action was performed on a message without viewing the content of the message.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
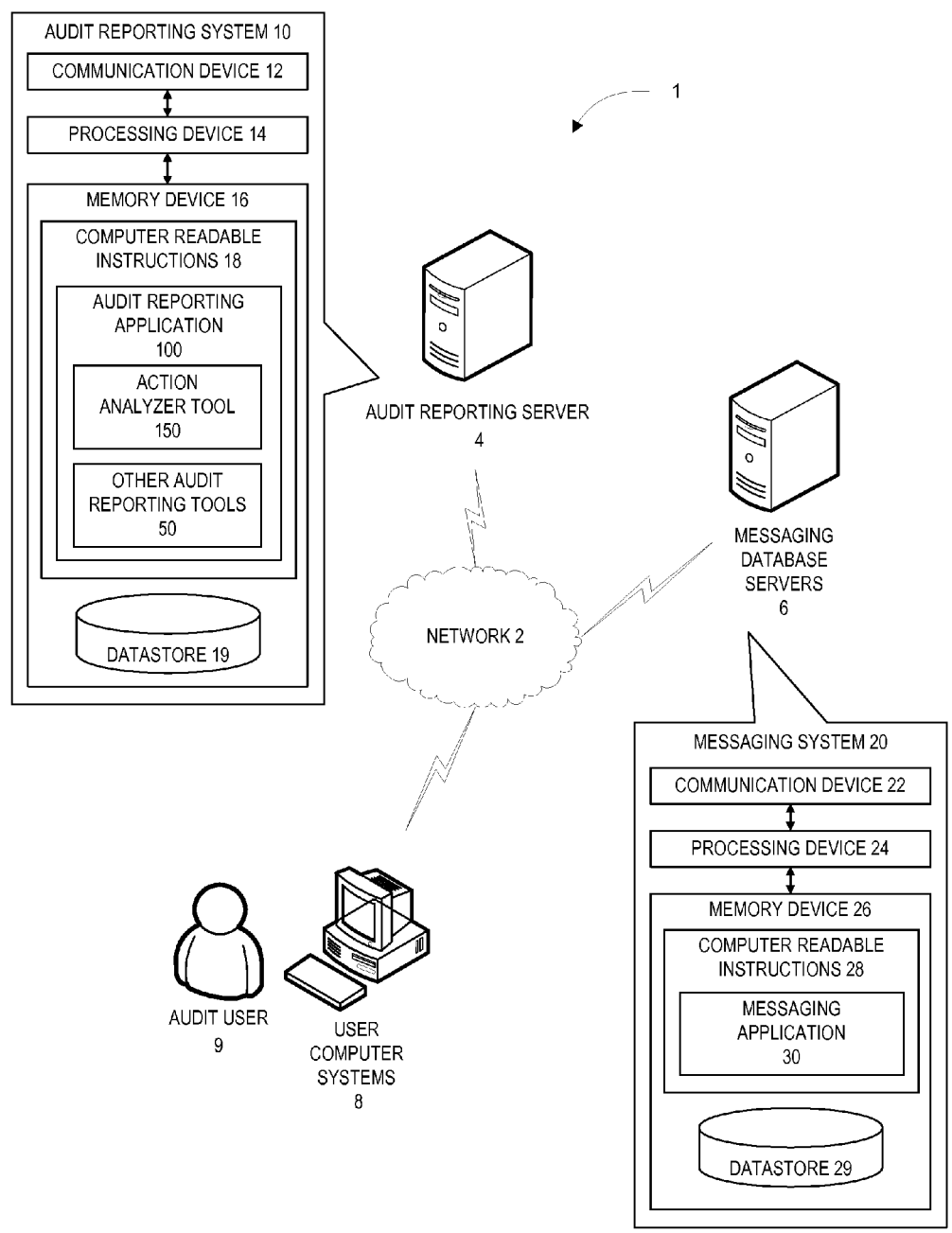
Figure 2:
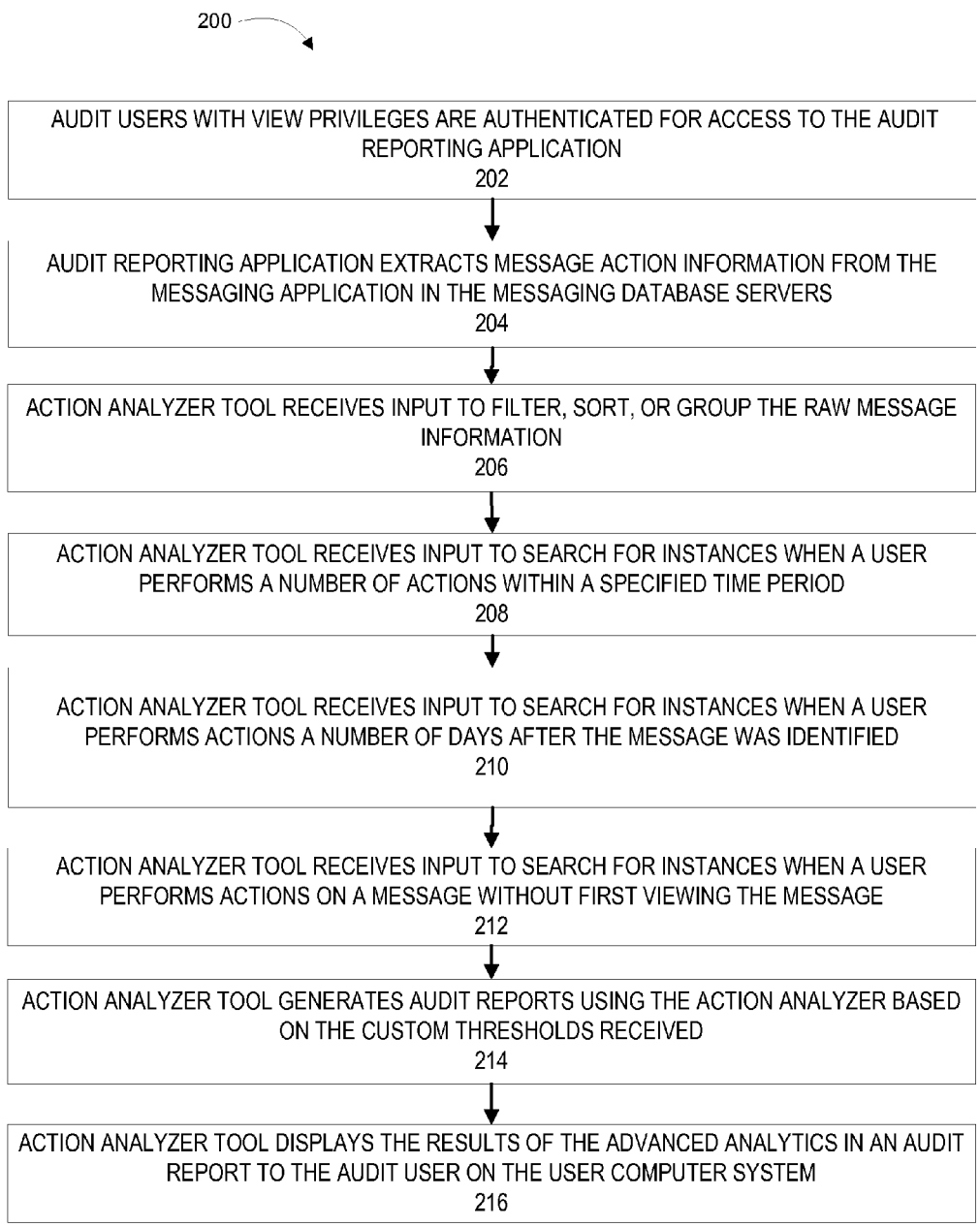
Figure 3:
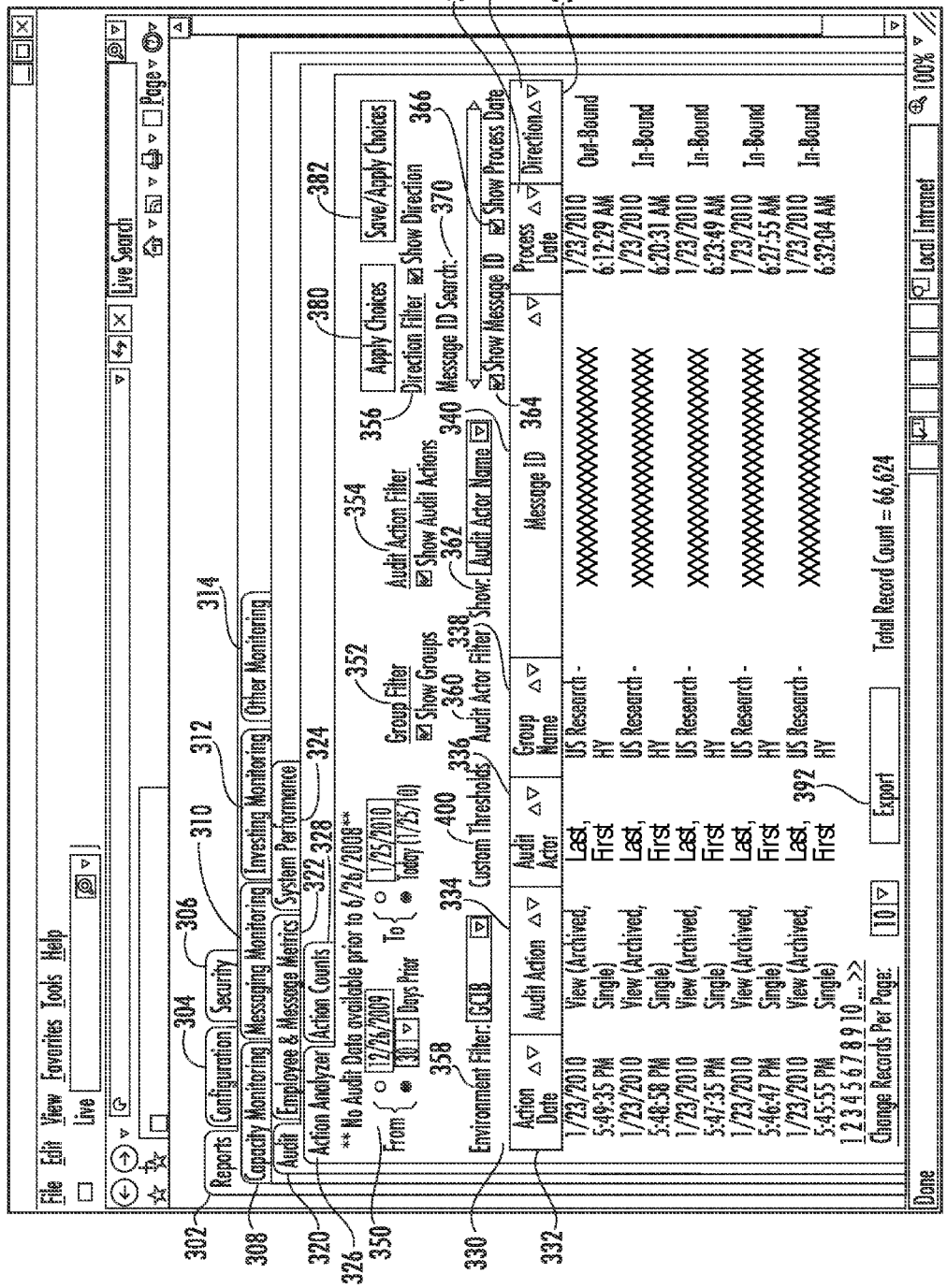
Figure 4:
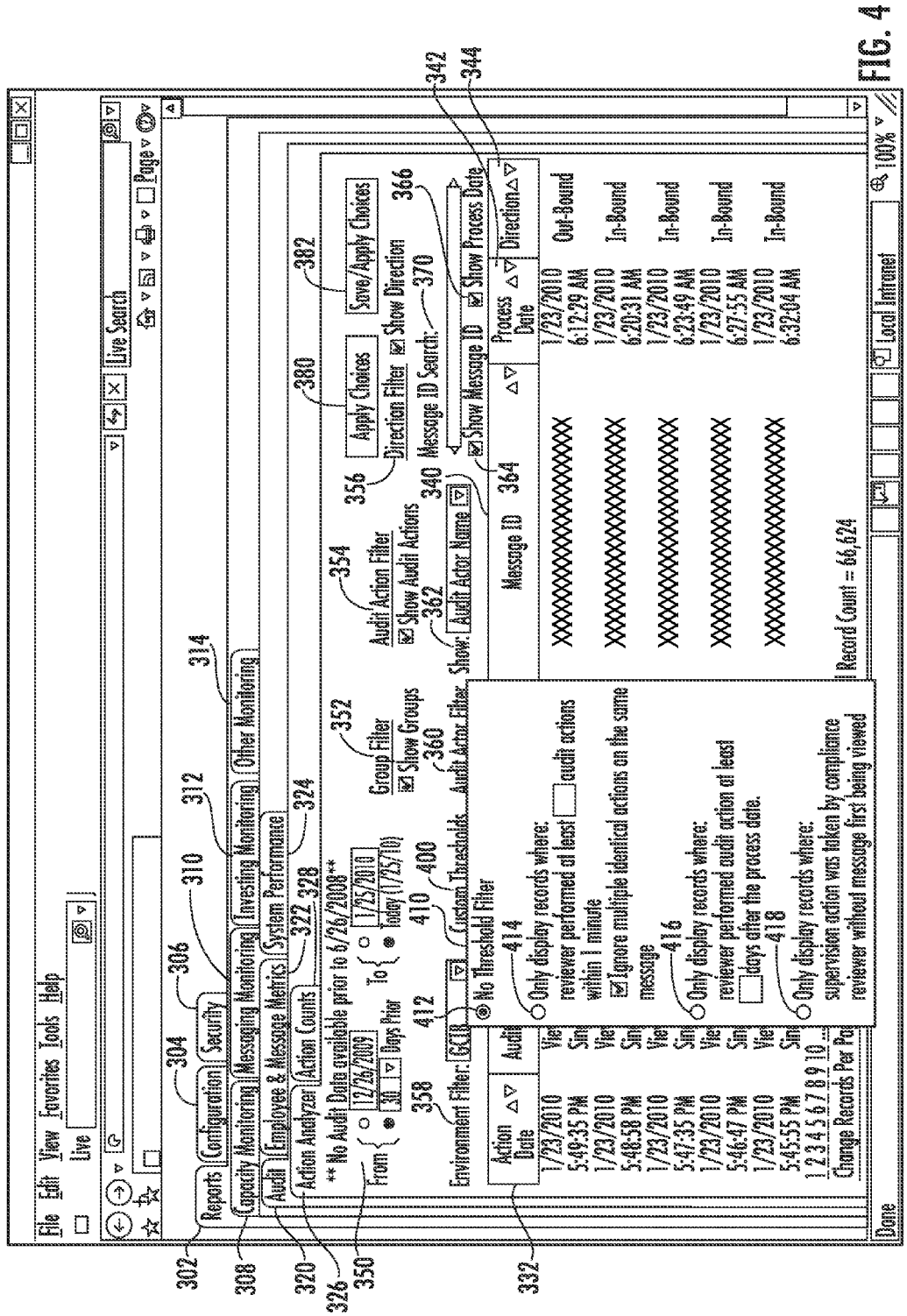

Having thus described embodiments of the invention in general terms, reference will now be made to the accompanying drawings, wherein:

FIG. 1 provides a block diagram illustrating an audit system environment, in accordance with an embodiment of the present invention;

FIG. 2 provides a process map illustrating an audit action analyzer process, in accordance with one embodiment of the present invention;

FIG. 3 provides an interface illustrating an audit action interface, in accordance with one embodiment of the present invention; and FIG. 4 provides an interface illustrating an audit action interface and custom threshold interface, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, JAVA, PERL, SMALLTALK, C++, SAS, SQL, PYTHON, OBJECTIVE C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

FIG. 1 illustrates an audit system environment 1, in accordance with an embodiment of the present invention. As illustrated in FIG. 1, the audit reporting server 4 is operatively coupled, via a network 2 to messaging database servers 6 and user computer systems 8. In this way, the audit reporting system 10 can receive messaging data from electronic communications that take place through various applications and are tracked and stored in the messaging system 20, and audit users 9 can view the messaging data in the audit reporting system 10 through user computer systems 8. In some embodiments of the invention, the audit user 9 is an employee of the business using the audit reporting system 10, however, in other embodiments of the invention the audit user 9 is an agent, contractor, or other person designated to act on behalf of the business. The network 2 may be a global area network (GAN), such as the Internet, a wide area network (WAN), a local area network (LAN), or any other type of network or combination of networks. The network 2 may provide for wireline, wireless, or a combination of wireline and wireless communication between devices on the network.

As illustrated in FIG. 1, the audit reporting system 10 is located on the audit reporting server 4, and generally comprises a communication device 12, a processing device 14, and a memory device 16. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 14 is operatively coupled to the communication device 12, and the memory device 16. The processing device 14 uses the communication device 12 to communicate with the network 2, and other devices on the network 2, such as, but not limited to, messaging database servers 6 and the user computer systems 8. As such, the communication device 12 generally comprises a modem, server, or other device for communicating with other devices on the network 2.

As further illustrated in FIG. 1, the audit reporting system 10 comprises computer-readable instructions 18 stored in the memory device 16, which in one embodiment include the computer-readable instructions 18 of an audit reporting application 100, which includes an action analyzer tool 150, as well as other audit reporting tools 50. In some embodiments, the memory device 16 includes a datastore 19 for storing data related to the audit reporting system 10, including but not limited to data created and/or used by the audit reporting application 100 and the action analyzer tool 150.

In the embodiment illustrated in FIG. 1 and described throughout much of this specification, the action analyzer tool 150 is illustrated as a tool that runs inside of and in conjunction with the audit reporting application 100. It is to be understood that in other embodiments of the invention, the action analyzer tool 150 is a part of the audit reporting application 100 itself, or in other embodiments is a separate application outside of the audit reporting application 100 that works in conjunction with the audit reporting application 100. Regardless of the configuration of the audit reporting application 100 and action analyzer tool 150, it is to be understood that they will work in substantially the same or similar way as they are described herein. Similarly, it will be understood that systems, devices, servers, processors, computers, networks, and other devices described herein may be made up of one system, device, server, processor, computer, network, etc., or numerous systems, devices, servers, processors, computers, networks, etc. working in conjunction with each other.

The audit reporting application 100, generally provides an audit user 9 the ability to perform reviews of compliance procedures used throughout the business that require supervisors to monitor, review, supervise, and take action on the communication sent and received between the regulated personnel at the business. Supervisors can include employees, agents, contractors, or any other person that the business has delegated to monitor, review, supervise, and take actions on the communication sent and received between the regulated personnel at the business. The communications sent and received between the regulated personnel at the business are described herein as messages. The supervisors are required by the compliance procedures to review any messages that have been flagged by the messaging system 20, explained in greater detail later, as inappropriate or as violating a business compliance policy. After reviewing the message, the supervisors take an action on the message, which in some embodiments comprises accepting or rejecting the message. Accepting the message indicates that the message passes the supervisor review and is determine to not be inappropriate or violating a business compliance policy. Rejecting the message indicates that the message fails the supervisor review and is determined to be inappropriate or violates a business compliance policy.

The audit reporting application 100 extracts information from the audit log in the messaging application 30 regarding the flagged messages and actions taken by the supervisors with respect to the flagged messages and stores them. As explained in greater detail later, the action analyzer tool 150 compiles, filters, and sorts the message information, allows more advance analytics about the information, and answers complex questions that are not easily available by looking at the raw message information or by using reports available in the messaging application 30. The action analyzer tool 150 breaks down the actions taken by the supervisors by running a number of different types of analytic usage patterns in order to determine if the supervisor is trying to take credit for an action that the supervisor did not actually perform or otherwise violating the accepted procedures for proper supervision and compliance.

As further illustrated in FIG. 1, the messaging systems 20 are located on messaging database servers 6. The messaging systems 20 generally comprise a communication device 22, a processing device 24, and a memory device 26. The processing device 24 is operatively coupled to the communication device 22 and the memory device 26. The processing device 24 uses the communication device 22 to communicate with the network 2, and other devices on the network 2, such as, but not limited to, the audit reporting server 4, and/or user computer systems 8. As such, the communication device 22 generally comprises a modem, server, or other device(s) for communicating with other devices on the network 2.

As illustrated in FIG. 1, the messaging systems 20 comprise computer-readable program instructions 28 stored in the memory device 26, which in one embodiment includes the computer-readable instructions 28 of a messaging application 30. In some embodiments, the memory device 26 includes a datastore 29 for storing data related to the messaging system 20, including but not limited to data created and/or used by the messaging application 30.

The messaging application 30 captures messages that are flagged as inappropriate or as violating a compliance policy at the business from the various applications used at the business that have the capability of sending or receiving messages. The various applications include, but are not limited to, e-mail applications, investing applications, system monitoring applications, instant messenger applications, as well as other messaging applications that allow for electronic communication over the network 2. The messages that are captured include messages in stand alone electronic communication applications or messages from a messaging component of a larger application that performs other functions. The messaging application 30 also captures information related to the actions that a supervisor has taken or failed to take with respect to reviewing a message and stores the information in an audit log table. The information includes what actions are being taken, by whom are they taken, what time they were taken, etc. When the audit reporting application extracts information from the messaging application the information is extracted from the audit log table. In some embodiments of the invention the messaging application 30 and the audit reporting application 100 can be contained within one application.

As further illustrated in FIG. 1, the user computer systems 8 are operatively coupled to the audit reporting server 4 and messaging database servers 6. The user computer systems 8 have devices the same or similar to the devices described for the audit reporting system 10 or the messaging system 20 (i.e. communication device, processing device, memory device with computer-readable instructions, datastore, etc.). Thus, the user computer systems 8 will communicate with the audit reporting system 10 and the messaging system 20 in the same or similar way as previously described with respect to the audit reporting system 10 and the messaging system 20. In this way, the audit users 9 can utilize the user computer systems 8 to communicate with the audit reporting application 100 and action analyzer tool 150 in order to view and use the audit reporting interface 300, action analyzer interface 330, and custom threshold interface 410 described in more detail later.

FIG. 2 illustrates an audit action analyzer process 200, in accordance with one embodiment of the present invention. In some embodiments of the invention administrators of the audit reporting application 100 provide view privileges to audit users 9 who require access to the audit reporting application 100. As illustrated in block 202 of FIG. 2, an audit user 9 who has been granted view privileges is authenticated for access to the audit reporting application 100 in order to view the audit reporting interface 300 as illustrated in FIG. 3. The audit reporting interface 300 includes a report tab 302, configuration setting tab 304, and security tab 306. Within the report tab 302 there is a capacity monitoring tab 308, messaging monitoring tab 310, investing monitoring tab 312, or other tabs 314 for other monitoring. By selecting the messaging monitoring tab 310, the audit user 9 can select either an audit tab 320, an employee and message metrics tab 322, or a system performance tab 324. The audit user 9 can further drill down to an action analyzer tab 326 or an action counts tab 328 after selecting the audit tab 320.

Once in the action analyzer tab 326 the audit user 9 is shown the action analyzer interface 330. As illustrated in block 204 of FIG. 2, the audit reporting application 100 extracts message action information from the action log in the messaging application 30, organizes the information, and displays the information in the action analyzer interface 330. In some embodiments, the action analyzer interface 330 displays information about the action date 332, the audit action 334, the audit actor 336, the group name 338, the message ID 340, the process date 342, and the direction 344 of the messages extracted from the audit log. In other embodiments of the invention other information related to the message is displayed in the action analyzer interface 330.

As illustrated in block 206 of FIG. 3 the audit reporting application 100 receives input for filtering, sorting, or grouping the information for the message action information extracted in block 204. In one embodiment, the action analyzer tool 150 automatically filters, sorts, or groups the information related to the messages based on system or audit user 9 preferences. In other embodiments of the invention, the audit user 9 determines how to filter, sort, or group the information related to the messages based on audit user input in the analyzer interface 330. As illustrated in FIG. 3, in some embodiment there is a date range filter 350 that allows an audit user 9 to filter the information in the action analyzer interface 330 by a date range or a number of days prior to the current day or some other specified date. The action analyzer interface 330 also includes a group filter 352, an audit action filter 354, a direction filter 356, an audit action filter 360, a message ID filter 364, and a process date filter 366 which allows an audit user 9 to add or remove the column related to each filter in the action analyzer interface 330. In some embodiments, the environmental filter 358 includes a drop down selection feature that allows the audit user 9 to separate message data into lines of business in order to analyze data for any current line of business or legacy line of business. The audit actor filter 360, also includes a drop-down feature 362 in some embodiments that allows the audit user to show the full name, employee ID or name/ID of the employee who performed the action. The message ID filter 364, in some embodiments, comprises a message ID search 370 section that allows the audit user 9 to search for a specific message by typing in the message ID illustrated in the message ID column 340.

In some embodiments of the invention there is also an apply changes click-button 380 or a save/apply changes click-button 382. These buttons allow an audit user 9 to either apply the changes to the filters on a one time only bases, by selecting the apply changes click-button 380, or to save the changes as permanent preferences, by selecting the save/apply choices click-button 382. In other embodiments of the invention the audit users 9 can also sort the order of the results in any of the columns by selecting the sorting arrows 390, in order to display the results in ascending or descending order. The audit user 9 may also export the messages to a table, chart, word processing, or other document by selecting the export click-button 392.

Audit users 9 can also perform custom filters on the messages extracted by selecting the custom threshold filter 400. The custom threshold filter 400 sorts through the raw message information displayed in the action analyzer interface 330 and answers questions that are not obvious to individual supervisors viewing the message information.

After selecting the custom threshold filter 400 the audit reporting application 100 provides a custom threshold interface 410 window, such as a pop-up window, to display the custom filter options, as illustrated in FIG. 4. In other embodiments of the invention the custom threshold interface 410 could be displayed in another tab or interface in the audit reporting application 100 or in the action analyzer interface 330. The custom threshold interface 400 allows an audit user 9 to further identify messages that are not meeting the compliance and regulatory metrics set by the government, business, or the individual lines of business. Without the action analyzer tool 150 it would be impossible for an audit user 9 to scan through the messages to determine if a supervisor was compliant with respect to the audit requirements set up by the government, business, or the individual lines of business.

As illustrated in the custom threshold interface 410 window in FIG. 4, in one embodiment, the standard default custom threshold filter is the no threshold selection 412. The audit user 9 can then choose to create custom thresholds for actions per minute 414, actions overdue 416, or actions not viewed 418, to name a few.

As illustrated by block 208 in FIG. 2, the audit user 9 can create a customized threshold to filter the messages displayed in the action analyzer interface 330 based on a specific number of actions taken within one minute by the same user by selecting the actions per minute 414 option. Using the actions per minute 414 option the audit user 9 can specify to the action analyzer tool 150 to identify users who looked at or acted upon a number of messages within a specific time frame. In some embodiments none, one, or both of the number of audit actions and time period can be set by the audit user 9. In other embodiments none, one, or both of the audit actions and time period can be set automatically by the audit reporting application 100 based on targets set by the government or the business. For example, the audit user 9 can identify supervisors who preformed actions on fifteen (15) messages within a one (1) minute time frame. The audit reporting application 100 searches the messages extracted from the audit log in the message application 30 for any users who completed fifteen (15) audit actions within a minute. This allows an audit user 9 to identify supervisors that did not properly perform their compliance duties. If the supervisor performed (15) actions within one (1) minute it may be evidence that they did not perform their job, since it likely takes more than one (1) minute to read one message and perform an action on it.

As illustrated by block 210 in FIG. 2, in other embodiments, the audit user 9 can also create a customized threshold to filter the messages in the action analyzer interface 330 to only display messages where the reviewer performed an action a number of days after the process date by selecting the actions overdue 416 option. Using the actions overdue 416 option the audit user 9 can specify to identify any supervisors that performed an audit action a specified number of days after the set process date or after the date the message first appeared in the messaging application 30. In some embodiments, an action should be performed on a message within a certain number of days as required by the government or the line of business. This customized threshold feature allows the audit user 9 to capture supervisors who are performing actions on messages after the dates on which the actions should be performed.

As illustrated by block 212 in FIG. 2, in other embodiments the audit user 9 can also create a customized threshold to filter the messages displayed in the action analyzer interface 330 to only display actions where a user performed an action on a message without actually viewing the content of the message by selecting the actions not viewed 418 option. This feature allows audit users 9 to capture supervisors that simply performed an action without viewing the contents of the messages by analyzing the differences in time from when the user first viewed the message until performing an action on the message. The allowable time between viewing and performing an action can be pre-set by the government, business, or line of business. In other embodiments of the invention the time between viewing and performing an action can be set by the audit user 9 in the custom threshold interface 410.

In other embodiments of the invention, other customized thresholds can be set up by the audit user 9 or audit system. For example, analyzing message type (e.g. internet email, corporate email, instant message, market data communication) or message direction (e.g. inbound, outbound, internal) reveals user review patterns against specific populations of messages. The analysis could be utilized for, but not limited to enforcing business compliance policies requiring certain supervision processes for instant messages or inbound internet email messages that may be more sensitive than other messages.

The audit user 9 could use one or more of the custom threshold filters described above at a time, in order to search for messages that meet one or more of the customer threshold filters.

After receiving the filter requirements from the audit user 9, the action analyzer tool 150 searches the message information extracted from the audit log to identify any supervisors or message information that meets the customized threshold criteria entered by the audit user 9 or set by the government or other compliance group. The action analyzer tool 150 then generates the list of supervisors or message information that meets the customized threshold criteria, as illustrated in block 214 of FIG. 2. The action analyzer tool 150 displays, through the use of the audit reporting application 100, the results of the search to the audit user 9 in the action analyzer interface 330, as illustrated by block 216 in FIG. 2.

The thresholds that are entered by the audit user 9 or set automatically in the customized threshold filter 400 are determine based on the compliance requirements of the government or based on the requirements of the business or each line of business. Therefore, for example the government may require that investment supervisors check messages and take actions within ten (10) days after they appear in the system. While the risk management line of business may only require supervisors to check messages and take actions within thirty (30) days after the messages appear in the system. Therefore the customized threshold search provides the audit system with the flexibility to determine the proper customized threshold searches for various requirements while providing the ability to quickly search, filter, and identify raw message information into usable message information. The audit system 10, and in particular the action analyzer tool 150 provides a mechanism to identify supervisors that are not performing timely reviews of messages (wherein timely reviews are defined by the government, business, or each individual line of business) and correct the problem.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An audit system for auditing user actions with respect to messages that require user review, the system comprising:
a memory device;
a communication device; and
a processor operatively coupled to the memory device and the communication device, wherein the processor is configured to execute computer-readable program code to:
access a message application that tracks the messages sent and received by regulated personnel within a business, wherein the message application allows a user to review the messages that have been flagged as violating business practices, wherein the messages are communications, wherein the user uses the messaging application to review the messages and take message actions regarding whether the messages comply or fail to comply with business compliance policies;
extract message action information from the message application, wherein the message action information comprises information regarding the message actions taken or failed to be taken on the messages by the user tasked with taking the message actions regarding whether the messages comply or fail to comply with the business compliance policies;
receive input from an audit user related to a custom threshold to identify custom message information from the message action information that meets the custom threshold, wherein the audit user chooses to create the custom threshold from a plurality of custom thresholds, wherein the plurality of custom thresholds includes at least a first custom threshold to identify custom message information associated with users that performed a number of actions on messages within a specified time period, a second custom threshold to identify custom message information associated with users that performed an action on a message a number of days after a set process date, and a third custom threshold to identify custom message information associated with users that performed an action on a message without viewing content of the message;
generate a list of the custom message information that meets the custom threshold, the list of the custom message information comprising an action date, an action, and a user name that took the action; and
display the list of the custom message information that meets the custom threshold, wherein the audit user uses the custom message information for determining if the message actions taken by users meet procedures for compliance with the business compliance policies.

2. The audit system of claim 1, wherein the user is a supervisor that is tasked with assigning the message actions to the messages in the message application.

3. The audit system of claim 1, wherein the processor is further configured to execute computer-readable program code to display the message action information for filtering, sorting, or grouping.

4. The audit system of claim 1, wherein the processor is further configured to execute computer-readable program code to receive input related to the audit users that have access to the audit system.

5. A computer program product for an audit system for auditing user actions with respect to messages that require user review, the computer program product comprising at least one non-transitory computer-readable medium having computer-readable program code portions embodied therein, the computer-readable program code portions comprising:
   an executable portion configured to access a message application that tracks the messages sent and received by regulated personnel within a business, wherein the message application allows a user to review the messages that have been flagged as violating business practices, wherein the messages are communications, wherein the user uses the messaging application to review the messages and take message actions regarding whether the messages comply or fail to comply with business compliance policies;
   an executable portion configured to extract message action information from the message application, wherein the message action information comprises information regarding the message actions taken or failed to be taken on the messages by the user tasked with taking the message actions regarding whether the messages comply or fail to comply with the business compliance polices;
   an executable portion configured to receive input from an audit user related to a custom threshold to identify custom message information from the message action information that meets the custom threshold, wherein the audit user chooses to create the custom threshold from a plurality of custom thresholds, wherein the plurality of custom thresholds includes at least a first custom threshold to identify custom message information associated with users that performed a number of actions on messages within a specified time period, a second custom threshold to identify custom message information associated with users that performed an action on a message a number of days after a set process date, and a third custom threshold to identify custom message information associated with users that performed an action on a message without viewing content of the message;
   an executable portion configured for generating a list of the custom message information that meets the custom threshold, the list of the custom message information comprising an action date, an action, and a user name that took the action; and
   an executable portion configured to display the list of the custom message information that meets the custom threshold, wherein the audit user uses the custom message information for determining if the message actions taken by the users meet procedures for compliance with the business compliance policies.

6. The computer program product of claim 5, wherein the user is a supervisor that is tasked with assigning the message actions to the messages in the message application.

7. The computer program product of claim 5, further comprising an executable portion configured to display the message action information for filtering, sorting, or grouping.

8. The computer program product of claim 5, further comprising an executable portion configured to receive input related to the audit users that have access to the audit system.

9. An audit analyzer method for auditing user actions with respect to messages that require user review within an audit system, the method comprising:
   accessing, by a processor, a message application that tracks the messages sent and received by regulated personnel within a business, wherein the message application allows a user to review the messages that have been flagged as violating business practices, wherein the messages are communications, wherein the user uses the messaging application to review the messages and take message actions regarding whether the messages comply or fail to comply with business compliance policies;
   extracting, by the processor, message action information from the message application, wherein the message action information comprises information regarding the message actions taken or failed to be taken on the messages by the user tasked with taking the message actions regarding whether the messages comply or fail to comply with the business compliance polices;
   receiving, by the processor, input from an audit user related to a custom threshold to identify custom message information from the message action information that meets the custom threshold, wherein the audit user chooses to create the custom threshold from a plurality of custom thresholds, wherein the plurality of custom thresholds includes at least a first custom threshold to identify message information associated with users that performed a number of actions on messages within a specified time period, a second custom threshold to identify message information associated with users that performed an action on a message a number of days after a set process date, and a third custom threshold to identify message information associated with users that performed an action on a message without viewing content of the message;
   generating, by the processor, a list of the custom message information that meets the custom threshold, the list of the custom message information comprising an action date, an action, and a user name that took the action; and
   displaying, by the processor, the list of the custom message information that meets the custom threshold, wherein the audit user uses the custom message information for determining if the message actions taken by the users meet procedures for compliance with the business compliance policies.

10. The audit analyzer method of claim 9, wherein the user is a supervisor that is tasked with assigning the message actions to the messages in the message application.

11. The audit analyzer method of claim 9, further comprising:
    displaying the message action information for filtering, sorting, or grouping.

12. The audit analyzer method of claim 9, further comprising:
    receiving input related to the audit users that have access to the audit system.

* * * * *